United States Patent
Simpson et al.

(10) Patent No.: US 7,659,970 B1
(45) Date of Patent: Feb. 9, 2010

(54) METHOD OF MEASURING DIFFRACTIVE LENSES

(75) Inventors: Michael J. Simpson, Arlington, TX (US); Jihong Xie, Fort Worth, TX (US)

(73) Assignee: Alcon, Inc., Hunenberg (CH)

( * ) Notice: Subject to any disclaimer, the term of this patent is extended or adjusted under 35 U.S.C. 154(b) by 0 days.

(21) Appl. No.: 11/564,498

(22) Filed: Nov. 29, 2006

Related U.S. Application Data

(60) Provisional application No. 60/741,004, filed on Nov. 30, 2005.

(51) Int. Cl.
    *G01B 9/00* (2006.01)
(52) U.S. Cl. .............. 356/124; 356/123; 356/125; 351/159; 351/168
(58) Field of Classification Search .......... 356/123–125; 351/159–168
    See application file for complete search history.

(56) References Cited

U.S. PATENT DOCUMENTS 6,819,413 B2 * 11/2004 Neal et al. ............... 356/123

2007/0002444 A1 * 1/2007 Piers et al. ............... 359/565
2007/0165242 A1 * 7/2007 Scott et al. ............... 356/601

* cited by examiner

*Primary Examiner*—Gregory J Toatley, Jr.
*Assistant Examiner*—Iyabo S Alli
(74) *Attorney, Agent, or Firm*—Jonathan E. Prejean

(57) ABSTRACT

A method and system for measuring an optical property of a multi-focal lens are disclosed. One embodiment of the method comprises: filtering out light transmitted by all but one of a plurality of diffraction orders of the lens to provide an unfiltered light from a single diffraction order; receiving the unfiltered light at a wavefront detector; and analyzing the unfiltered light at the wavefront detector to measure the optical property. The multi-focal lens can be a multi-focal diffractive intra-ocular lens. The measured optical property can be a discontinuity in the lens surface. Filtering can comprise blocking all but the unfiltered light using an aperture operable to let through the unfiltered light from the single diffraction order, and/or blocking all but the unfiltered light using an opaque obstruction operable to let through only a selected amount of light corresponding to the light transmitted by the single diffraction order. The method can further comprise generating an image quality parameter, such as a modulation transfer function, based on the measured optical property.

8 Claims, 10 Drawing Sheets

Modal fit.
This is the standard CrystalWave output for a ReSTOR lens

Modal + Zonal fit.
This indicates differences between the regions in the fringe pattern (but not the numbers)

0.5 x 0.3 mm aperture to block near lens power

CrystalWave camera images (lens is in focus on camera, so the rings are clearly seen).

CrystalWave Zonal+Modal fringes

Standard 2mm

11(b)

11(a)

METHOD OF MEASURING DIFFRACTIVE LENSES

CROSS-REFERENCE TO RELATED APPLICATIONS

This application claims priority under 35 U.S.C. §119 to U.S. Provisional Patent Application No. 60/741,004, filed Nov. 30, 2005, the entire contents of which are incorporated herein by reference.

TECHNICAL FIELD OF THE INVENTION

The present invention relates generally to multifocal diffractive ophthalmic lenses and, more particularly, to a method of measuring the optical properties of a multifocal diffractive lens.

BACKGROUND OF THE INVENTION

Intraocular lenses are routinely implanted in a patient's eye during cataract surgery to compensate for the lost optical power that results when the natural lens is removed. In other applications, an intraocular lens can be implanted in a patient's eye, which retains its natural lens, so as to provide an optical power for correcting a refractive error of the natural eye. Many different types of intraocular lenses exist for treating a variety of conditions to provide a patient with corrected vision.

Periodic diffractive structures can diffract light simultaneously into several directions, also typically known as diffraction orders. In multifocal intraocular lenses, for example, two diffraction orders can be utilized to provide a patient with two optical powers, one for distance vision and the other for near vision. Such diffractive intraocular lenses ("IOLs") are typically designed to have an "add" power that provides a separation between the far focus and the near focus. In this manner, a diffractive intraocular lens can provide a patient in whose eye the lens is implanted with vision over a range of object distances. For example, a diffractive IOL can replace a patient's natural lens to provide the patient not only with a requisite optical power but also with some level of pseudo-accommodation. In another application, a diffractive IOL or other ophthalmic lens can provide the eye of a patient who suffers from presbyopia—a loss of accommodation of the natural lens—with pseudo-accommodative ability.

One example of a multifocal diffractive IOL is the ReSTOR apodized diffractive lens, manufactured by Alcon Laboratories, Inc., of Fort Worth, Tex. The ReSTOR lens is used to create two primary lens powers to provide a patient with good vision at different distances. It would be useful to (a) to measure the optical quality of such a diffractive lens in the laboratory or a manufacturing facility, and (b) to measure the optical quality of an eye that contains a diffractive lens (where the overall optical performance is affected by properties of the eye).

Wavefront measurement systems are used in opthalmology and other fields to measure an optical wavefront, but this is normally done for a lens with a single focus. These systems are not specifically designed to evaluate a lens with more than one power, and, in particular, they are not designed to evaluate diffractive lenses with more than one power.

There is therefore a need for a method and system for measuring the optical properties of a diffractive lens, such as by a wavefront analysis, both in a laboratory or manufacturing facility, and when implanted in an eye.

BRIEF SUMMARY OF THE INVENTION

The embodiments of the method and system for measuring the optical properties of a diffractive lens of the present invention substantially meet these needs and others. It is important to note that although this disclosure uses as an example the ReSTOR lens, the embodiments of the method of this invention can be equally applied to measure the optical properties of any diffractive lens. The embodiments of the method of this invention can also be used to measure diffractive lenses that may have toric and aspheric components.

One embodiment of the method of the present invention comprises filtering diffraction orders. A diffraction order (lens power) can correspond to a lens region. This embodiment of the method can be implemented by obstructing the light that is directed into a second (and/or other) main diffraction order of a lens. For example, the lens may have a plurality of lens powers (diffraction orders). Filtering of the light from one or more lens powers can be done with a small aperture at one intermediate focus, or by a small opaque obstruction at the other. The method is illustrated in FIG. 1, which shows light from the eye transmitted to a wavefront sensor using a relay lens system. By blocking the light directed to the second lens power, only light from the first lens power is directed to the wavefront system, which is then able to measure the optical quality of light from a single lens power.

For example, this embodiment of the method for measuring an optical property of a multi-focal lens of the present invention can comprise: filtering out light transmitted by all but one of a plurality of diffraction orders of the lens to provide an unfiltered light from a single diffraction order; receiving the unfiltered light at a wavefront detector; and analyzing the unfiltered light at the wavefront detector to measure the optical property. The multi-focal lens can be a multi-focal diffractive intra-ocular lens. The measured optical property can be a discontinuity in the lens surface. Filtering can comprise blocking all but the unfiltered light using an aperture operable to let through the unfiltered light from the single diffraction order, and/or blocking all but the unfiltered light using an opaque obstruction operable to let through only a selected amount of light corresponding to the light transmitted by the single diffraction order. The method can further comprise generating an image quality parameter, such as a modulation transfer function, based on the measured optical property.

Another embodiment of the method of the present invention involves measuring the local wavefront with high resolution, rather than measuring the wavefront diffracted into a single diffraction order. When light from a diffractive lens is incident on a wavefront sensor, the local wavefront slopes can be measured within each diffraction zone using a wavefront sensor with a large number of sampling points. The local slopes within each zone can be compared to the lens design, and the overall optical properties of the lens can be determined. This embodiment does not measure the wavefront of the lens directly in a diffraction order, but instead essentially measures the localized properties of the lens surface, and the overall lens properties can be reconstructed from this information using knowledge of the lens design.

With a lens such as the ReSTOR lens, where the outer lens region has no diffractive zones, measurements made in that region can be combined with those from the central region. It is also possible to use solely the measurements from the outer lens region to evaluate the optical properties for large pupils.

Further understanding of the invention can be obtained by reference to the following detailed description in conjunction with the associated drawings, which are described briefly below.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

The embodiments of the present invention provide advantages over prior art lens measurement methods and systems in that wavefront measurements can provide information about the quality of an optical system at different locations across a lens. This information can be used to generate image quality parameters, such as modulation transfer function ("MTF") or resolution, which describe properties that are useful in determining how an image might appear. The information is also of direct use for a lens manufacturer, or for anyone interested in improving an optical system composed of, for example, an eye and an intra-ocular lens ("IOL"), because it can be used to determine which regions of the IOL (lens) provide beneficial or detrimental contributions to optical performance of the system. For example, measurements of image quality can be used to indicate whether a lens is acceptable or unacceptable, but they do not evaluate the overall imaging characteristics of the lens. A wavefront measurement can be used to evaluate the optical properties across the surface of a lens, and these can be used to control the optical performance or to identify the specific cause of image quality variations.

Figure 1:
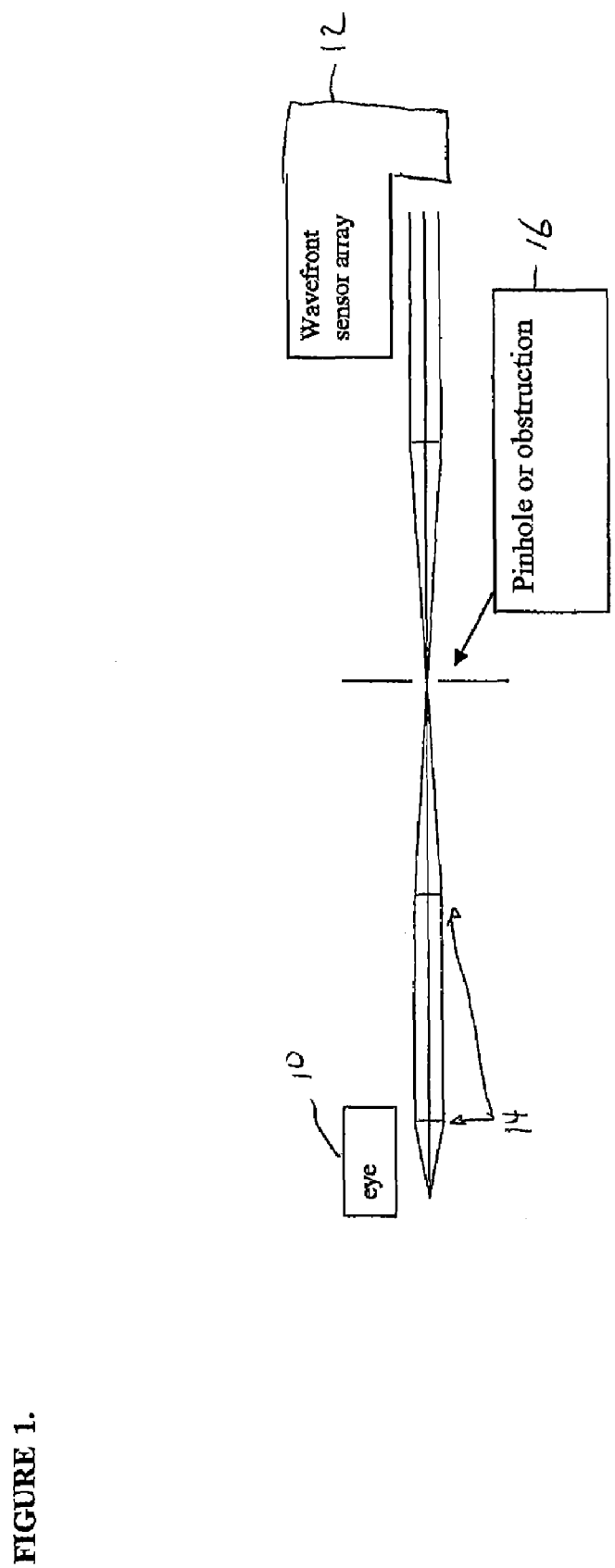
FIG. 1 depicts light from an eye 10 relayed to a wavefront sensor 12.

Filtering diffraction orders in accordance with one embodiment of the method of this invention can be accomplished as shown in FIG. 1, which depicts light from an eye 10 relayed to a wavefront sensor 12. This embodiment of the method of this invention can also be used for a laboratory or industrial system. The light comes to intermediate foci in a relay lens system 14, and at one of these locations the light from the second primary lens power can be removed. This can be done using, for example, a small pinhole 16, to let through the light of interest, or using a small opaque obstruction, to remove light that is not of interest. The wavefront of the lens power that is permitted to reach the wavefront detector 12 can then be determined and analyzed.

The range of aberrations that can be analyzed may be reduced when stops are used in this manner. The range can be improved using additional lenses in order to control the light that is analyzed. For example, when there is a strong cylindrical error, a cylindrical lens of the correct power can be used to remove the cylindrical component before analysis. Shaped stops can also be used, or slits for astigmatic lenses. Similarly, in the presence of large amounts of spherical aberration, the aberration can be adjusted using additional optical elements before the light reaches the stop.

Another embodiment of the method of the present invention involves measuring the local wavefront with high resolution, rather than measuring the wavefront diffracted into a single diffraction order. When light from a diffractive lens is incident on a wavefront sensor, the local wavefront slopes can be measured within each diffraction zone using a wavefront sensor with a large number of sampling points. This can be accomplished using, for example, the Crystalwave system, made by Wavefront Sciences for the measurement of intraocular lenses. The Crystalwave system is a wavefront measurement system that has a large number of lenslets and a high lenslet density.

Figure 2:
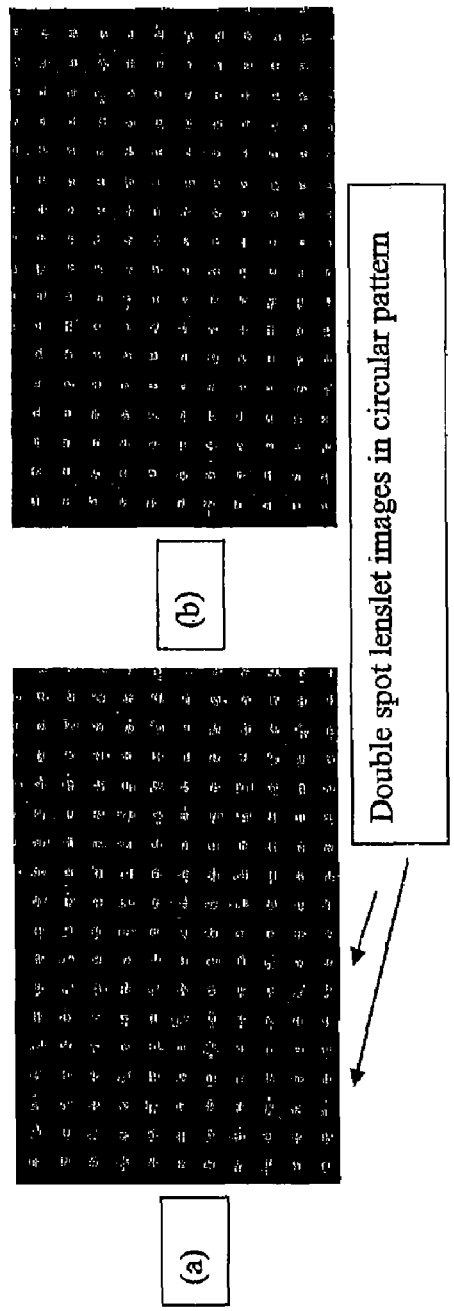
FIG. 2(a) is a Crystalwave lenslet image of a ReSTOR lens.
FIG. 2(b) is a Crystalwave lenslet image of a monofocal lens for comparison to the ReSTOR lens of FIG. 2(a)

FIG. 2(a) is a Crystalwave lenslet image of a ReSTOR lens. The diffractive zone boundaries of the ReSTOR lens are clearly visible in the image as double spots at some locations of the zone boundary, and as deformed or blurry spots at other locations. FIG. 2(b) is a Crystalwave lenslet image of a monofocal lens for comparison. The double spot is more clearly shown in FIG. 3(a) in comparison to a single spot. The lenslet density is otherwise high enough that the optical slope of each diffractive zone in the central region is analyzed. There are only complications where a lenslet samples a lens region that includes the boundary of a diffractive zone.

Figures 3A, 3B:
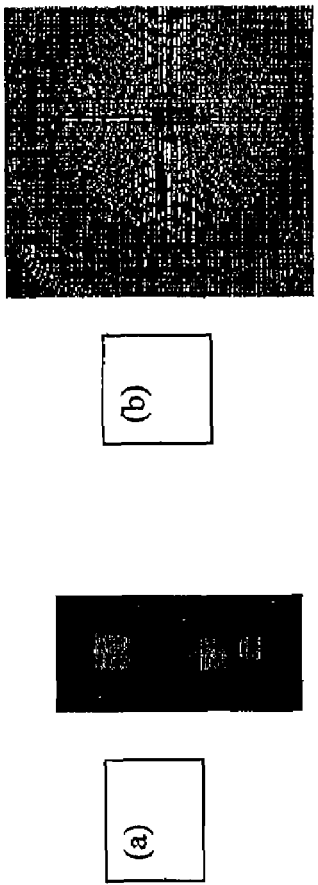
FIG. 3(a) is a magnified comparison of a single spot to a double spot from FIG. 2(a)
FIG. 3(b) is a plot of the wavefront slopes calculated for a ReSTOR lens.

The spot locations from the lenslet image are converted to wavefront slopes, and the slope map for a ReSTOR lens is shown in FIG. 3(b). The length of the lines indicate the local slope, and it can be seen that the outer lens region, which has no diffractive structure, is very different from the central region. Local slopes are calculated, however, and they can be used to reconstruct the surface.

Figure 4:
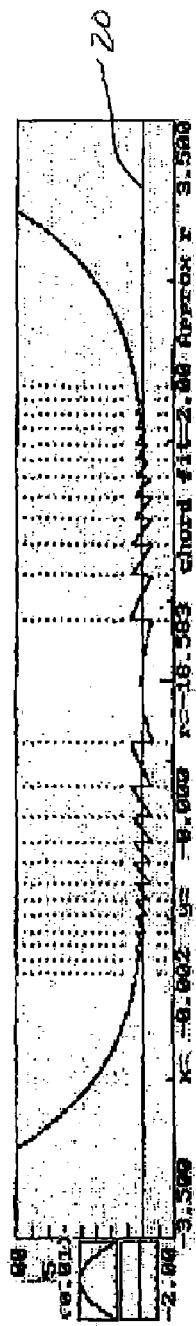
FIG. 4 depicts the cross-sectional surface profile of an experimental apodized diffractive lens surface, where a sphere has been subtracted in order to reveal the fine surface structure.

The cross-sectional surface profile of an experimental apodized diffractive lens is depicted in FIG. 4, where a spherical surface has been subtracted in order to reveal the fine surface structure. The horizontal line 20 represents a circle, and the surface deviations from this are shown over a range from −2 microns to +8 microns. The local surface slopes, which can be converted directly by calculation to the wavefront slopes that are measured by a Hartmann-Shack wavefront system, are clearly visible. Software modifications can be made to deliberately exclude lenslet locations that provide ambiguous results. Information about the wavefront in the region of a zone boundary can also be deliberately evaluated to determine the fine structure of the desired portion of the lens surface.

Figure 5:
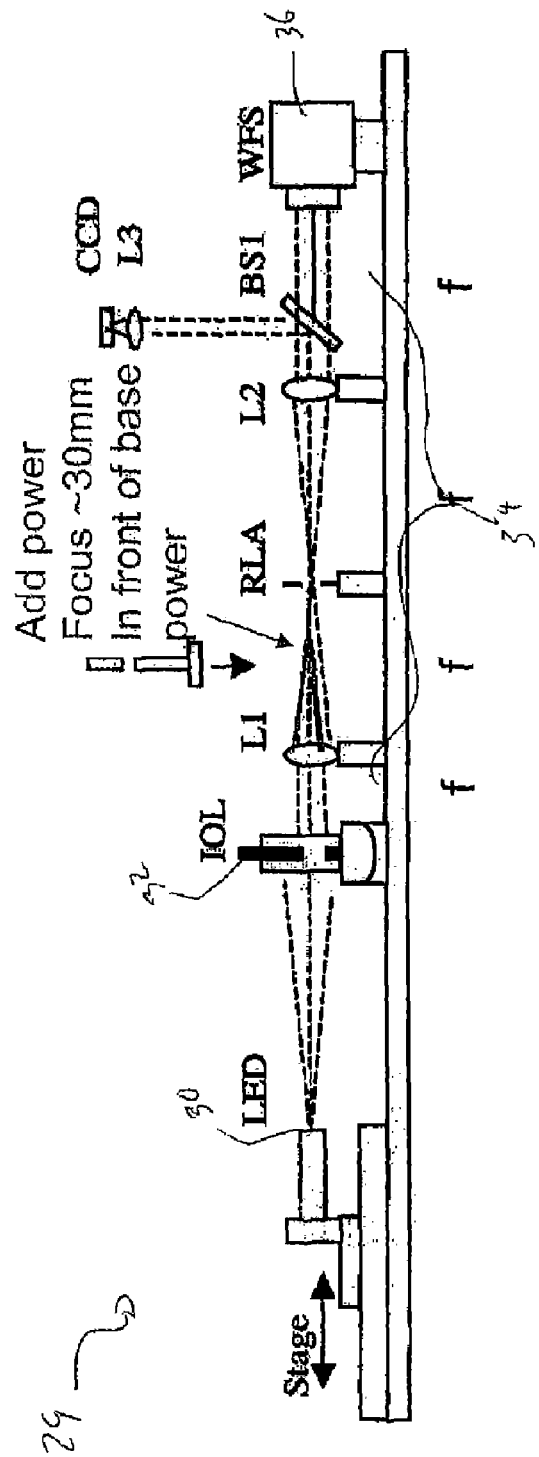
FIG. 5 depicts an optical test system 29 that can be used with an embodiment of the method of this invention.

An optical test system 29 that can be used with the embodiments of the method of this invention is depicted in FIG. 5. A point source 30 is largely collimated by the lens 32 that is being tested. The aim is to measure the wavefront at the exit pupil of the lens, but because it is difficult to put the detector at this location, a relay system 34 is used. The relay system typically consists of two doublets L1 and L2. If the lenses have the same focal length they can be set up in a 4f configuration which has two important optical paths: (a) the exit pupil is imaged onto the wavefront detector 36 lenslet array (inside the camera in FIG. 5), and (b) at the same time, collimated light at the pupil is also collimated at the detector 36. This arrangement relays the wavefront to the detector 36, while also imaging the pupil onto the detector 36. The doublets L1 and L2 in the relay system 34 could also have different focal lengths in order to adjust the magnification of the optical test system.

A Hartmann-Shack wavefront sensor, such as wavefront detector 36, that can be used with the embodiments of this invention can comprise an array of lenslets. Each lenslet in the array focuses the portion of a wavefront that enters the lens to a spot, and any tilt in the local wavefront is visible as a lateral movement of the focused spot compared to the focus of a perfect plane wave. The wavefront local slopes are determined, and these slopes are used to reconstruct the wavefront. This reconstruction of the wavefront can be affected by noise in the measured data, and by approximations used in the mathematical description of the wavefront.

Two common reconstruction methods can be used to reconstruct a wavefront. One, Zernike fitting, fit the local slopes to a set of Zernike polynomials. If only a few Zernike terms are used, the higher order deviations of the wavefront are ignored. The other, Zonal fitting, fits the local slopes together in more local regions in order to achieve a better fit. With either method there can be error in the wavefront that is reconstructed from the slope data, particularly when the wavefront has slope changes over small regions, or when the measurement itself introduces noise into the data. Wavefronts calculated from the reconstructed data are always pristine, which can be misleading as to any included error. Any error in the reconstruction can be determined, however, by comparing the measured wavefront slopes to the reconstructed wavefront.

A wavefront is expected to be smooth and continuous, because the principle of the detection method is that each lenslet will focus a small portion of the wavefront, in order to determine a single slope for that region of the wavefront. Any fluctuations of the slope over a lenslet will thus not be recorded, and this may also lead to an error in the average slope value. A discontinuity in the wavefront, such as a step for a diffractive lens or a Fresnel lens, is not expected at all by the detecting methods of current wavefront detectors.

Figure 6:
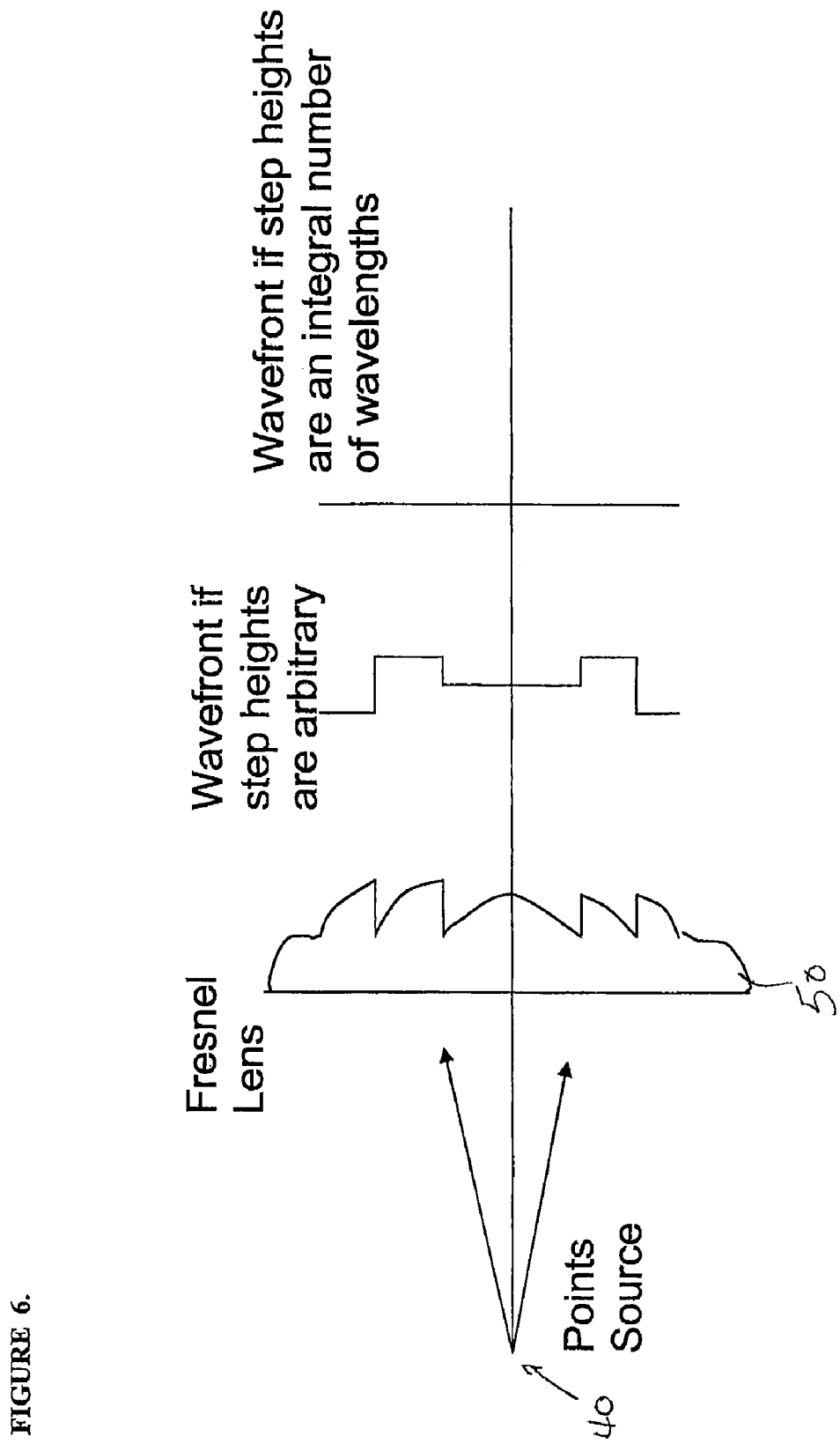
FIG. 6 illustrates how light is collimated by a monofocal Fresnel lens 50, with the slope of the lens surface (lens zones) increasing with increasing distance from the lens optical axis in order to compensate for the increasing incidence angle of the light.

A Fresnel lens is a useful example to consider before discussing diffractive lenses. A Fresnel lens is a monofocal lens where the bulk of the lens has been removed by shifting the lens surface in the axial direction. These shifts are usually at arbitrary locations, and they usually have arbitrary optical delays. FIG. 6 is a diagram illustrating how light is collimated by a Fresnel lens 50, with the slope of the lens surface (lens zones) increasing with increasing distance from the lens optical axis. This slope change matches the increasing angle of incidence of light from the point source up to create collimated light. A typical Fresnel lens will have phase discontinuities at the steps, though it should also be possible to make a "tuned" Fresnel lens where the step heights are increments of a wavelength for monochromatic light.

The CrystalWave system measures IOLs in a single pass configuration at 550 nm, with the IOL in a simple wet cell (see FIG. 5). It has a high density of lenslets, and something that is immediately striking in the detector image is the apparent superposition of the diffractive zones (FIGS. 2(a) and (b) and 3(a)). On close inspection, it can be seen that this zone appearance is due to deformations in the spots, some of which have distinct double spots, as can be seen in the magnified view of a double spot shown in FIG. 3(a).

Figure 7:
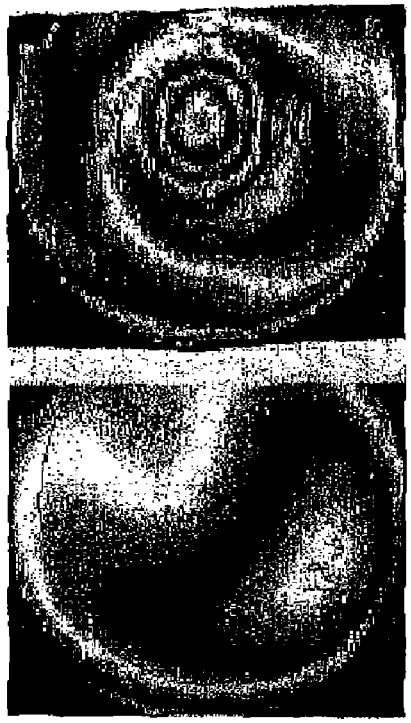
FIG. 7 illustrates exemplary wavefront results.

Exemplary wavefront results can be seen in FIGS. 7(a) and 7(b). The normal evaluation that is performed for a monofocal lens is shown in FIG. 7(a) where the wavefront appears to be smooth and continuous for "modal" calculations. When the same measured data are recalculated using the "zonal" method as shown in FIG. 7(b), it is obvious that the central region of the lens is actually very different from the rest of the lens. Crystalwave does not provide wavefront summaries for the zonal calculation and the numerical values are all for the zonal Zernike method.

The principle of the measurement for a multifocal lens, such as the ReSTOR lens, is the same as that for a monofocal lens in CrystalWave, where the wavefront is relayed from the exit pupil of the lens to a wavefront detector. The step discontinuities in the wavefront will tend to diffract light out of the system, but most of the light will be transferred as long as there are no small apertures in the relay system.

Returning to FIG. 5, the optical system 29 is shown for a ReSTOR lens 32, where two main images are formed in the relay system, rather than a single image. It is clear from FIG. 5 that the optical system is trying to measure the wavefront at the lens 32 itself, before the light has propagated to form the two main lens powers. Additional light also goes into higher diffraction orders that create other lens powers with lower energy. Even if the measurement were successful, this would not be a measurement of either the distance power wavefront, or the near power wavefront, since these are created as the light propagates.

An alternative way to evaluate the optical system is to consider the two wavefronts that are created for the two primary powers of the lens 34. In FIG. 5, these two distinct wavefronts create two foci in the relay system 34. As the light propagates further to the lenslet array, the light recombines to create the single discontinuous wavefront that is measured by the lenslet array. The diffractive zones actually redirect the light at different angles, in order to create the apodization effect of the ReSTOR lens, and the wavefront has similar properties to the surface profile of the lens.

In a system such as CrystalWave there are many lenslets across the central zone, with fewer and fewer lenslets across the zones further out as they get narrower. This is the local wavefront of the lens, however, and it does not directly provide information about either of the two lens powers.

Figure 8:
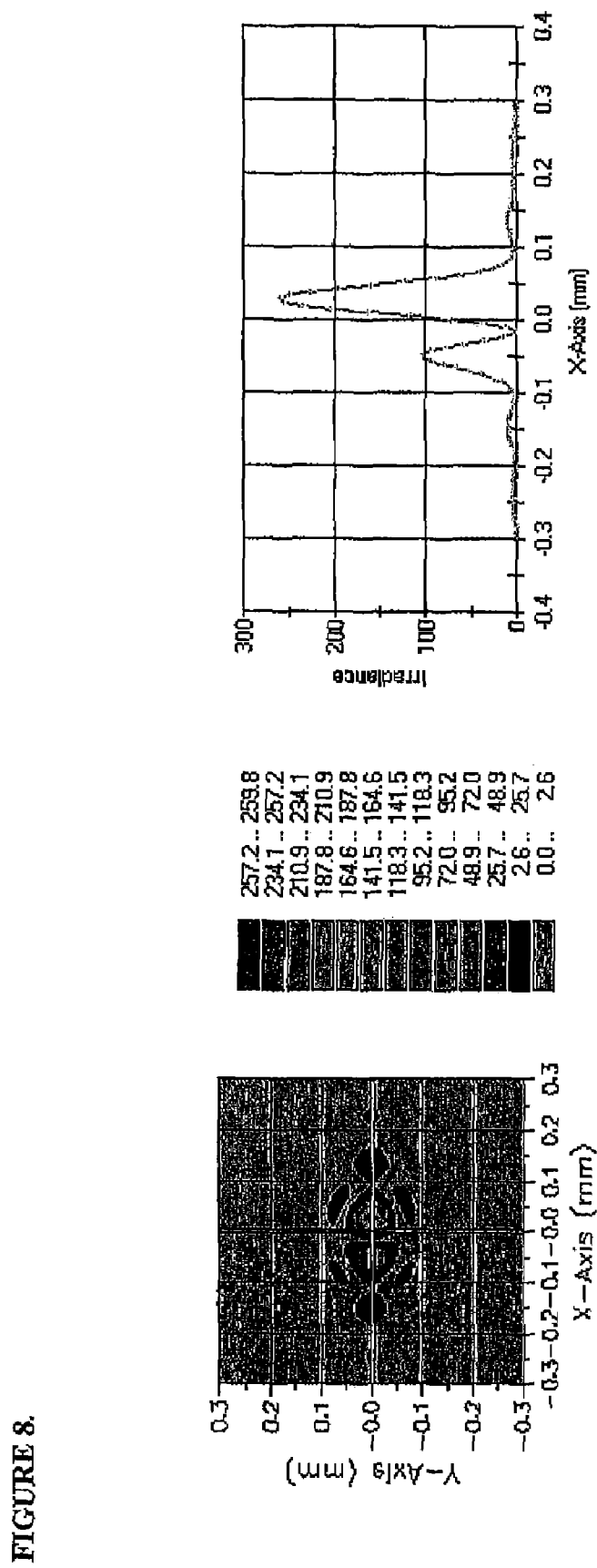
FIG. 8 illustrates the effect of delaying the phase across half of a lenslet by half a wavelength.

The cause of the double spots of FIG. 2(a) was evaluated using physical optics calculations in the ASAP non-sequential optical software from Breault Research. Modeling a phase delay of a half wavelength for one half of the lens aperture, it can be seen (FIG. 8) that the focused spot for a single lenslet becomes a double spot. A double spot is created by interference between the two halves of the lens, even though the wavefront has no slope. The mean energy location for this double spot also is not at the focus location that corresponds to the underlying wavefront slope.

In practice, a zone boundary would rarely bisect the lenslet aperture exactly, and the zones of the ReSTOR lens only have similar slopes for the central zones. The interpretation of lenslet data where a zone boundary is included is complicated. A double spot will not always be present, and sometimes the spot will just appear to be blurred.

Figure 9:
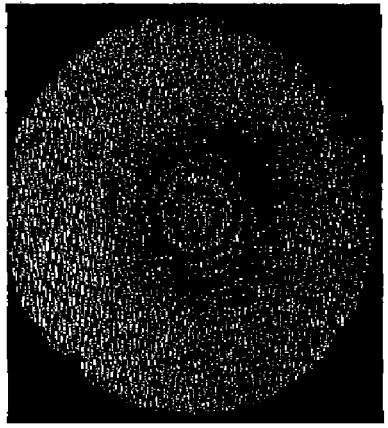
FIG. 9 shows Crystalwave images of a lens (top), and of reconstructed wavefronts (bottom)
Figure 9:
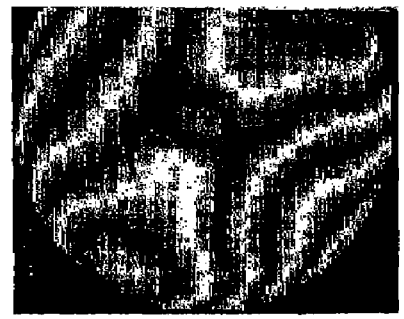
Figure 9:
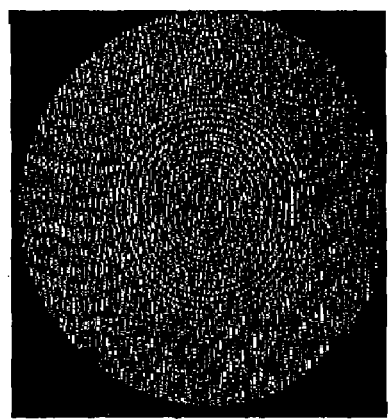
Figure 9:
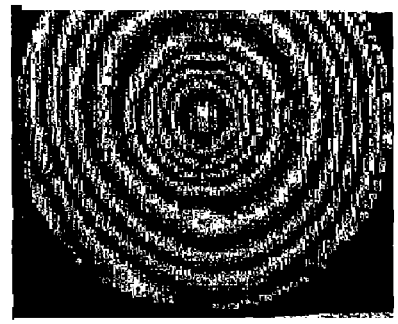

In accordance with the teachings of this invention, a small aperture was placed in the CrystalWave relay system 34 to act as a spatial filter to filter out the higher diffraction orders. FIG. 9 shows various Crystalwave images with and without the aperture. When the light was primarily from the base power of the lens, with the other light blocked by the aperture surround, the wavefront output from the system became more like a single wavefront. CrystalWave also has a camera that images the lens itself through the relay system, and the effect of filtering can also be seen in this image.

ReSTOR lenses were also measured on the LADARWave system, manufactured by Alcon Laboratories, of Fort Worth, Tex. The LADARWave system uses a wavelength of 830 nm, and a double-pass system. The longer wavelength changes the diffraction efficiency of the lens into different diffraction orders, with most of the light going into the base lens power. On close inspection, distortion of the array of spots can also be seen.

Figure 10:
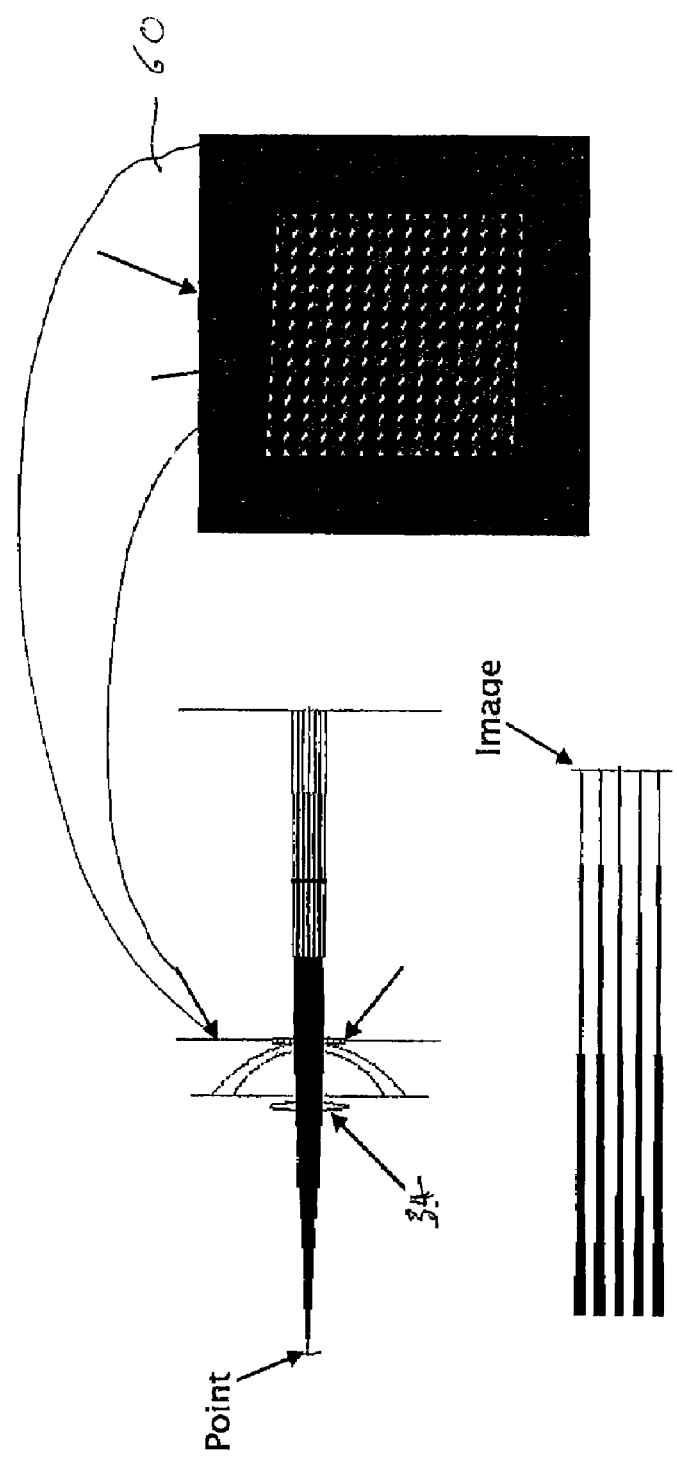
FIG. 10 shows a simplified modeling of light captured by a lenslet array.
Figure 11:
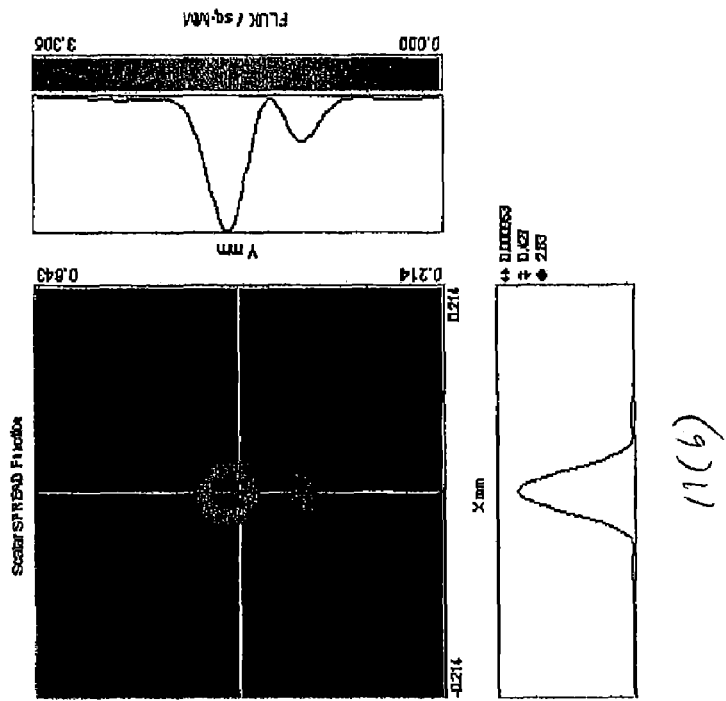
FIGS. 11(a) and 11(b) illustrate a calculation of the cross-sectional intensity profile across the point image from a lenslet receiving (a) a monofocal wavefront and (b) a diffractive wavefront.
Figure 11:
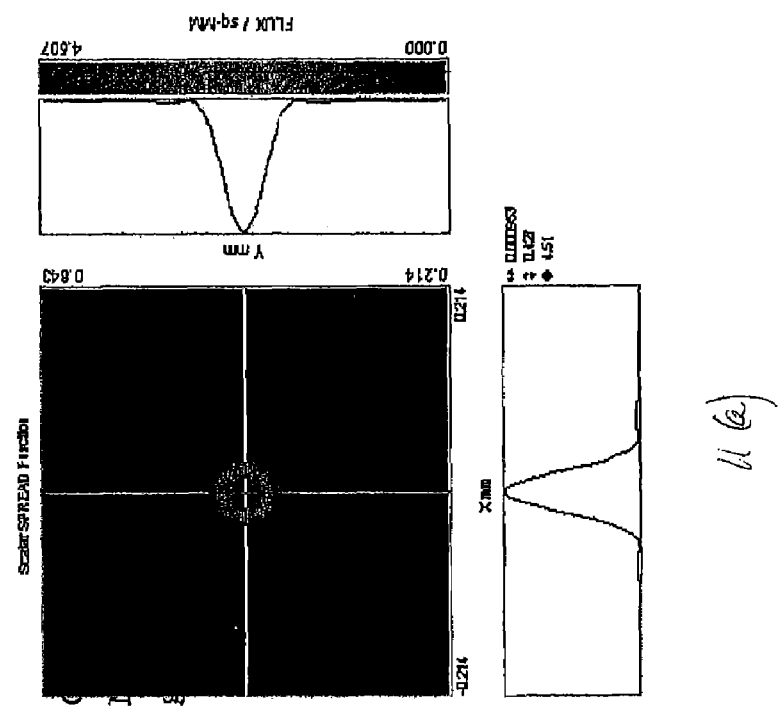

Further evaluation was done by modeling the ReSTOR lens in ASAP and evaluating the image of a lenslet. The LADARWave system lenslets are much larger than those of the CrystalWave system, and a single lenslet will typically include two or more zones. The optical system is depicted in FIG. 10, where the relay system is not included. The lenslet array 60 is placed at the cornea to simplify the system. The result for a single lenslet is seen in FIGS. 11(*a*) and 11(*b*), where the spot is displaced compared to a comparative wavefront. This displacement is due to both the discontinuities in the wavefront and to the small change in slope at the zone boundaries. FIGS. 11(*a*) and 11(*b*) illustrate calculation for a lenslet that is 0.429×0.429 mm centered at 0.429 mm from the optical axis. The first zone boundary is at 0.371 mm from the optical axis. The spot in FIG. 11(*a*) is for a monofocal lens. The spot of FIG. 11(*b*) shows that the image spot shifts for the ReSTOR lens, and that a second faint spot appears.

It is clear that existing wavefront systems are trying to measure the total wavefront, and not the actual wavefront of interest (that of the distance power of the lens). The present invention shows that although the wavefront is divided into the two primary wavefronts in the relay system, these components interfere again at the lenslet plane to reconstruct the original complex wavefront that started out at the lens.

Figure 12:
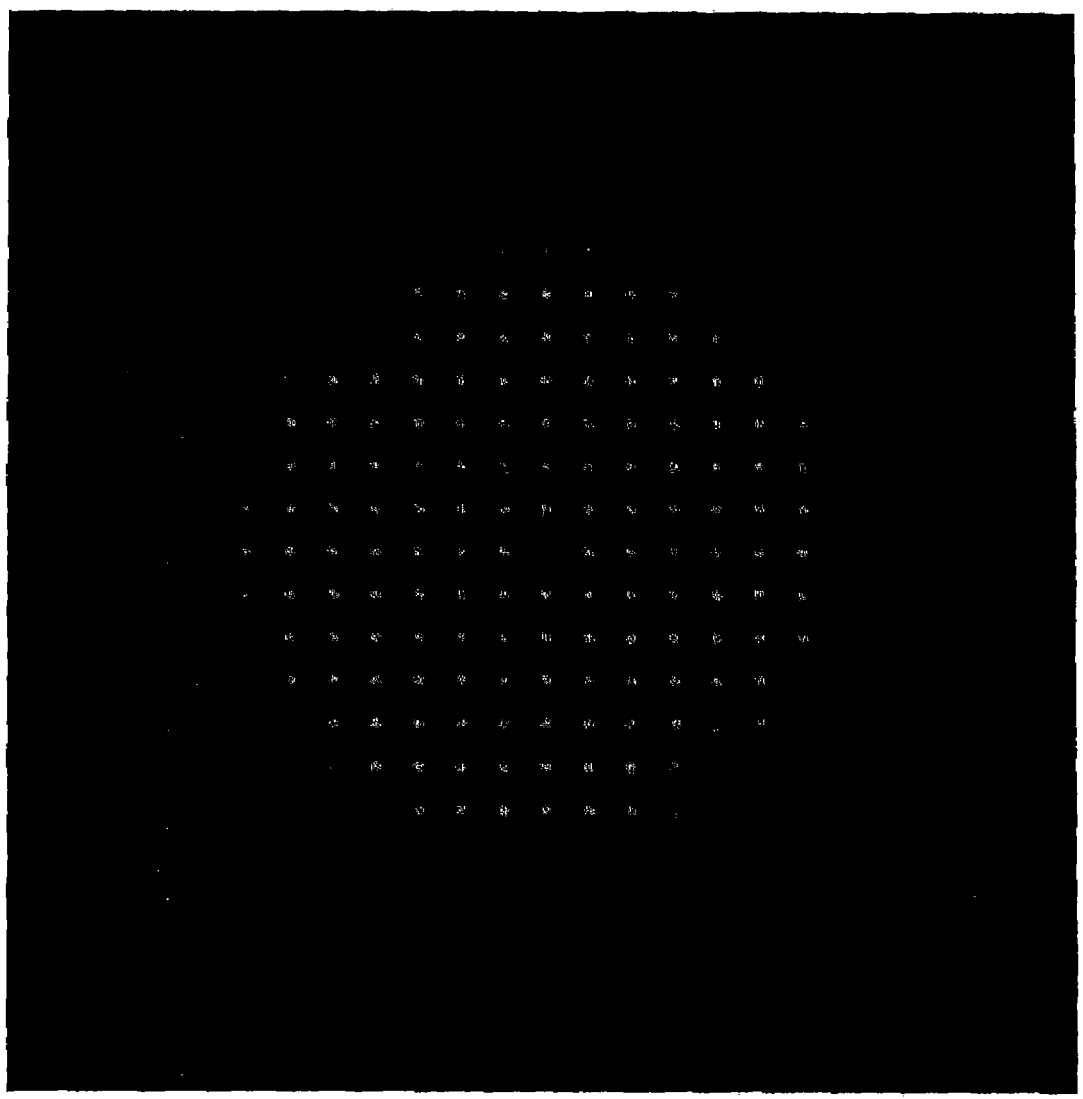
FIG. 12 is a photo of a ReSTOR lens in a wet cell measured by LADARWave and showing modification of the spots in the diffractive region.

FIG. 12 is photo of a ReSTOR lens in a wet cell measured by LADARWave. The additional streaks on the spots that are visible in this extremely high quality image are due to the discontinuities at the zone boundaries. This is the type of spot feature that has been found by calculation using the ASAP software. Compensation can be made for this effect in order to measure the optical properties of the underlying lens.

Although the present invention has been described in detail herein with reference to the illustrated embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method for measuring an optical property of a multi-focal lens, comprising:

filtering out light transmitted by all but one of a plurality of diffraction orders of the lens to provide an unfiltered light from a single diffraction order;

receiving the unfiltered light at a wavefront detector; and analyzing the unfiltered light at the wavefront detector to measure the optical property.

2. The method of claim 1, wherein the multi-focal lens is a multi-focal diffractive intra-ocular lens.

3. The method of claim 1, wherein the optical property is a discontinuity in the lens surface.

4. The method of claim 1, wherein filtering comprises blocking all but the unfiltered light using an aperture operable to let through the unfiltered light from the single diffraction order.

5. The method of claim 1, wherein filtering comprises blocking all but the unfiltered light using an opaque obstruction operable to let through only a selected amount of light corresponding to the light transmitted by the single diffraction order.

6. The method of claim 1, further comprising generating an image quality parameter based on the measured optical property.

7. The method of claim 6, wherein the image quality parameter is a modulation transfer function for the lens.

8. The method of claim 1, wherein the lens is implanted in an eye.

* * * * *

UNITED STATES PATENT AND TRADEMARK OFFICE
CERTIFICATE OF CORRECTION

PATENT NO.          : 7,659,970 B1
APPLICATION NO.     : 11/564498
DATED               : February 9, 2010
INVENTOR(S)         : Simpson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 44 days.

Signed and Sealed this

Thirtieth Day of November, 2010

David J. Kappos
*Director of the United States Patent and Trademark Office*